(12) United States Patent
Chenillo

(10) Patent No.: US 9,426,514 B1
(45) Date of Patent: Aug. 23, 2016

(54) GRAPHIC REFERENCE MATRIX FOR VIRTUAL INSERTIONS

(71) Applicant: Samuel Chenillo, New York, NY (US)

(72) Inventor: Samuel Chenillo, New York, NY (US)

(*) Notice: Subject to any disclaimer, the term of this patent is extended or adjusted under 35 U.S.C. 154(b) by 0 days.

(21) Appl. No.: 14/947,710

(22) Filed: Nov. 20, 2015

Related U.S. Application Data

(60) Provisional application No. 62/148,448, filed on Apr. 16, 2015.

(51) Int. Cl.

| | |
|---|---|
| *H04N 5/272* | (2006.01) |
| *H04N 21/431* | (2011.01) |
| *G06T 3/00* | (2006.01) |
| *H04N 21/2187* | (2011.01) |
| *H04N 21/81* | (2011.01) |
| *G06T 7/00* | (2006.01) |

(52) U.S. Cl.
CPC .......... *H04N 21/4312* (2013.01); *G06T 3/0006* (2013.01); *G06T 3/0093* (2013.01); *G06T 7/0044* (2013.01); *H04N 5/272* (2013.01); *H04N 21/2187* (2013.01); *H04N 21/816* (2013.01); *H04N 21/8153* (2013.01); *G06T 2207/10016* (2013.01); *G06T 2207/20048* (2013.01); *G06T 2207/20221* (2013.01)

(58) Field of Classification Search
CPC ..................................................... H04N 5/272
USPC .................. 348/589, 584, 586, 588, 590–601
See application file for complete search history.

(56) References Cited

U.S. PATENT DOCUMENTS

| | | | |
|---|---|---|---|
| 5,264,933 A | 11/1993 | Rosser et al. | |
| 7,116,342 B2 * | 10/2006 | Dengler | G06T 15/20 345/619 |
| 8,391,542 B2 | 3/2013 | Avrahami | |
| 8,548,276 B2 | 10/2013 | Honma | |
| 8,599,317 B2 | 12/2013 | Shamur et al. | |
| 8,805,007 B2 * | 8/2014 | Zhang | G06T 7/0044 382/103 |
| 2007/0279494 A1 * | 12/2007 | Aman | G01S 3/7864 348/169 |
| 2015/0297949 A1 * | 10/2015 | Aman | G06T 7/2033 348/157 |

* cited by examiner

*Primary Examiner* — Paulos M Natnael
(74) *Attorney, Agent, or Firm* — r.r (princeton); Roy Rosser

(57) ABSTRACT

A system and method for automatically acquiring a matrix of digital reference images containing landmarks relevant to recognizing and tracking objects in a digital video image is disclosed. In order to virtually insert a digital graphic having a correct pose in a stream of images, an indexed matrix of images of the landmarks in a venue is accumulated. The system and method allow for automated acquisition of new landmarks within a venue, and for the automated expansion of the reference matrix to accommodate reference images indicative of changed conditions within a venue and for reference images of new landmarks. When a landmark is recognized in an image, the graphic reference matrix is queried to obtain a preferred reference image to be used in making a virtual insertion.

12 Claims, 5 Drawing Sheets

135

165

GRAPHIC REFERENCE MATRIX FOR VIRTUAL INSERTIONS

CROSS-REFERENCE TO RELATED APPLICATIONS

This application claims priority to U.S. Provisional Patent Application Ser. No. 62/148,448 filed Apr. 16, 2015, the contents of which are fully incorporated herein by reference.

BACKGROUND OF THE INVENTION (1) Field of the Invention

This invention relates to a system and method for recognizing and tracking objects in a digital video image, and more particularly to a system and method for automatically acquiring, over a period of time, a matrix of digital reference images relevant to a particular location for use in performing match-moving integration, or combination, of video streams, or virtual graphic insertions, in live or recorded video depictions of that location.

(2) Description of Related Art

Image recognition based match-moving compositing of video streams, also known as virtual image insertion, is an established technology for combining imagery such as, but not limited to, computer generated animations, with live or recorded video sequences. The technology is widely used in both cinematography and in the production of live and recorded sports events. One particular, popular example of the technology in use is the virtual insertion of the first down line in broadcasts of football.

A problem inherent in the technology is that of providing good reference images for the image recognition and tracking software to use in positioning and orienting the virtual insertions. Changes in camera positions, angles and movement, as well as changes in lighting conditions that are not well reflected in the reference images being used by a video insertion system can result in even the most sophisticated searching and tracking algorithms performing poorly and even failing. This type of problem may be particularly evident in productions involving outdoor venues such as, but not limited to, daytime sporting events where lighting conditions may change rapidly and continually throughout the course of an event.

What is needed to solve this technical problem is a system and method for automatically and accurately providing a robust set, or matrix, or relevant reference images. Such a reference matrix of images would preferably be both an accurate map of the venue as currently seen by the cameras being used as well as having historical data that may be reverted to when conditions change back to some previous state. It would also be desirable to have a matrix of images that is able to automatically expand to include new landmarks as they appear or become available.

The relevant prior art includes:

U.S. Pat. No. 5,264,933 issued to Rosser, et al. on Nov. 23, 1993 entitled "Television displays having selected inserted indicia" that describes an apparatus and method of altering video images to enable the addition of images, message, slogans or indicia in such a manner that they appear to be part of the original image as displayed. The application of the apparatus and method is particularly adapted to be used as advertising during sporting events or other events whereby an operator selects a portion of the video image display such as a portion of a tennis court, recognizes the selected portion and inserts a logo or advertising message into that selected portion. The message is inserted into the selected portion of the court independent of how the scene is being panned or viewed by the television camera. The apparatus employs a pattern recognition algorithm to recognize the specific selected image portion and by means of the image processor substitute the logo into the first image to provide a display which appears as if the inserted image was actually painted on or otherwise permanently positioned on the court. Thus the inserted images are seamlessly and realistically incorporated into the original even as the original scene is moved, panned, magnified, zoomed or otherwise altered in size or perspective. The resulting composite image appears to the television viewer to be absolutely real and present at the scene.

U.S. Pat. No. 8,599,317 issued to Shamur et al. on Dec. 3, 2013 entitled "Scene recognition methods for virtual insertions" that describes a method of adding a virtual insertion to an image, according to an embodiment, includes extracting dynamic features from an input image, associating the dynamic extracted features with dynamic reference features in a reference feature database, generating a camera model based on the associations, mixing a virtual insertion into the input image based on the camera model, and outputting an image containing both the input image and the virtual insertion. According to another embodiment, a method of adding a virtual insertion to an image includes generating a biased camera model using a statistically selected subset of a plurality of non-fixed regions of the image, locating fixed reference objects in the image using the biased camera model as an entry point for a search, generating a corrected camera model using the fixed reference objects in the image, and adding a virtual insertion to the image using the corrected camera model.

U.S. Pat. No. 8,548,276 issued to Honma et al. on Oct. 1, 2013 entitled "Image search apparatus, image scanning apparatus, image search system, database creation method, and database creation program" that describes an image search apparatus capable of communicating with an image scanning apparatus includes: a common area extraction portion to compare a plurality of registration images stored in the storage portion and to extract a common area including an identical or similar image among a plurality of registration images; a search area determination portion to determine a non-common area excluding the common area, as a search area; a transmission request portion to request transmission of a document image if, as a result of comparison by the comparison portion, a registration image in which the reference image is identical or similar to the partial image does not exist in the plurality of registration images; and a registration portion to, in response to a request by the transmission request portion, store a document image received from the image scanning apparatus as a registration image into the storage portion.

U.S. Pat. No. 8,391,542 issued to Avrahami on Mar. 5, 2013 entitled "Method for estimating the pose of a PTZ camera" that describes an iterative method of estimating the pose of a moving PTZ camera. The first step is to use an image registration method on a reference image and a current image to calculate a matrix that estimates the motion of sets of points corresponding to the same object in both images. Information about the absolute camera pose, embedded in the matrix obtained in the first step, is used to simultaneously recalculate both the starting positions in the reference image and the motion estimate. The recalculated starting positions and motion estimate are used to determine the pose of the camera in the current image. The current image is taken as a new reference image, a new current image is selected and the process is repeated in order to determine the pose of the camera in the new current image. The entire process is repeated until the camera stops moving.

Various implementations are known in the art, but fail to address all of the problems solved by the invention described herein. Various embodiments of this invention are illustrated in the accompanying drawings and will be described in more detail herein below.

BRIEF SUMMARY OF THE INVENTION

An inventive system and method of creating and using a graphic reference matrix for a virtual insertion of a digital graphic, or video, into a digital video stream is disclosed.

In a preferred embodiment, a digital graphic may be required to be mixed in, or composited with, a video stream originating from a venue that may contain one or more reference landmarks. These landmarks may, for instance, be, objects, or portions of an object, located at that particular venue. The required position of the virtually inserted digital graphic may have been articulated with respect to one or more of those reference landmark by its "pose", i.e., by its location, orientation and magnification as compared to one or more of the landmarks.

In order to perform the virtual insertion, a graphic reference matrix may first be constructed. The graphic reference matrix may, for instance, be an indexed accumulation of images of the landmarks in the venue that may have been taken over a period of time by one of more cameras that may include the camera currently being used positioned where it is currently located.

In a preferred embodiment, the graphic reference matrix may have been created using a digital data processor programmed to perform various functions on a digital image. The processor may, for instance, have received a digital image containing a representation of one or more of the landmarks present in the venue. The processor may have recognized a landmark in an image using standard image processing methods and then stored that image in a database as a reference image indexed by parameters such as, but not limited to, the venue it was taken at, the landmark recognized, the date and time the image was taken, the camera used to take it and the location of the camera used. At a later time, other images may be obtained and processed. These may be compared to the original reference image by, for instance, first transforming them so that the recognized landmark in them has the same pose as in the original reference image, i.e., it corresponds in magnification, location and orientation with its representation in the original reference image. The comparison may, for instance, be accomplished by a pixel by pixel comparison of pixels within a region of overlap between the original reference image and the transformed image taken at a later time. Based on that comparison, a decision may be made as to whether it is worth keeping the new image as an additional reference image to be used under certain circumstances such as, but not limited to, when certain lighting conditions are present. The new reference image may then be added to the graphic reference matrix, appropriately indexed by parameters that may include a difference value that may be a single number indicative of an assessment of a mathematical aggregated comparison of corresponding pairs of pixels evaluated in the region of overlap between the original reference image and the transformed second reference image.

In a preferred embodiment, the processor may then receive an additional stream of images during, for instance, the course of broadcasting an event from that particular venue. The processor may examine each image of that stream for a representation of one or more of the known landmarks in that venue. If the processor recognizes, or locates, a known landmark, it may then query the graphic reference matrix to obtain a preferred reference image, i.e., the reference image deemed by the parameters by which it is indexed to be the most suitable given factors such as, but not limited to, the current date, time and prevailing lighting or weather conditions.

The new digital image may then be compared to, or contrasted with, the preferred reference image to obtain a required transform that may be a set of warp parameters that may be used to conform the new image to the preferred reference image and/or vice versa. These warp parameters may then be used to perform the virtual insertion of the digital graphic into the new digital image.

The digital processor may also examine received images for additional representations of structures, or portions of structures, that may be used as additional landmarks. If such a suitable new landmark is discovered, the processor may then calculate a pose of the landmark as displayed in the image. That pose may, for instance, be determined with reference to another existing landmark within the same image. The digital processor may be programmed to then store the image containing the newly acquired landmark in the graphic reference matrix as a new reference image indexed by suitable parameters indicative of information such as, but not limited to, the pose of the new landmark both within the image and with reference to another, known landmark in the image, the time of capture of the image, the camera used to obtain the image, and the position of the camera, or some combination thereof.

Therefore, the present invention succeeds in conferring the following, and others not mentioned, desirable and useful benefits and objectives.

It is an object of the present invention to provide an automatically updatable and expandable graphic image matrix for use as digital reference images in match-moving image processing and virtual image insertion.

It is another object of the present invention to provide a graphic image matrix that is comprehensively indexed by properties relevant to recognizing and tracking landmarks within a stream of digital video images.

BRIEF DESCRIPTION OF THE SEVERAL VIEWS OF THE DRAWINGS

FIG. 4 B shows a graphic representation of an exemplary second digital image containing a representation of a reference landmark.

FIG. 4 C shows a graphic representation of an exemplary suitably transformed second digital image being compared with the first digital image.

FIG. 4 D shows a graphic representation of an exemplary third digital image containing a representation of a reference landmark.

FIG. 4 E shows a graphic representation of the exemplary third digital image containing a representation of an exemplary reference landmark with a virtual insertion of a digital graphic.

DETAILED DESCRIPTION OF THE INVENTION

Figure 1:
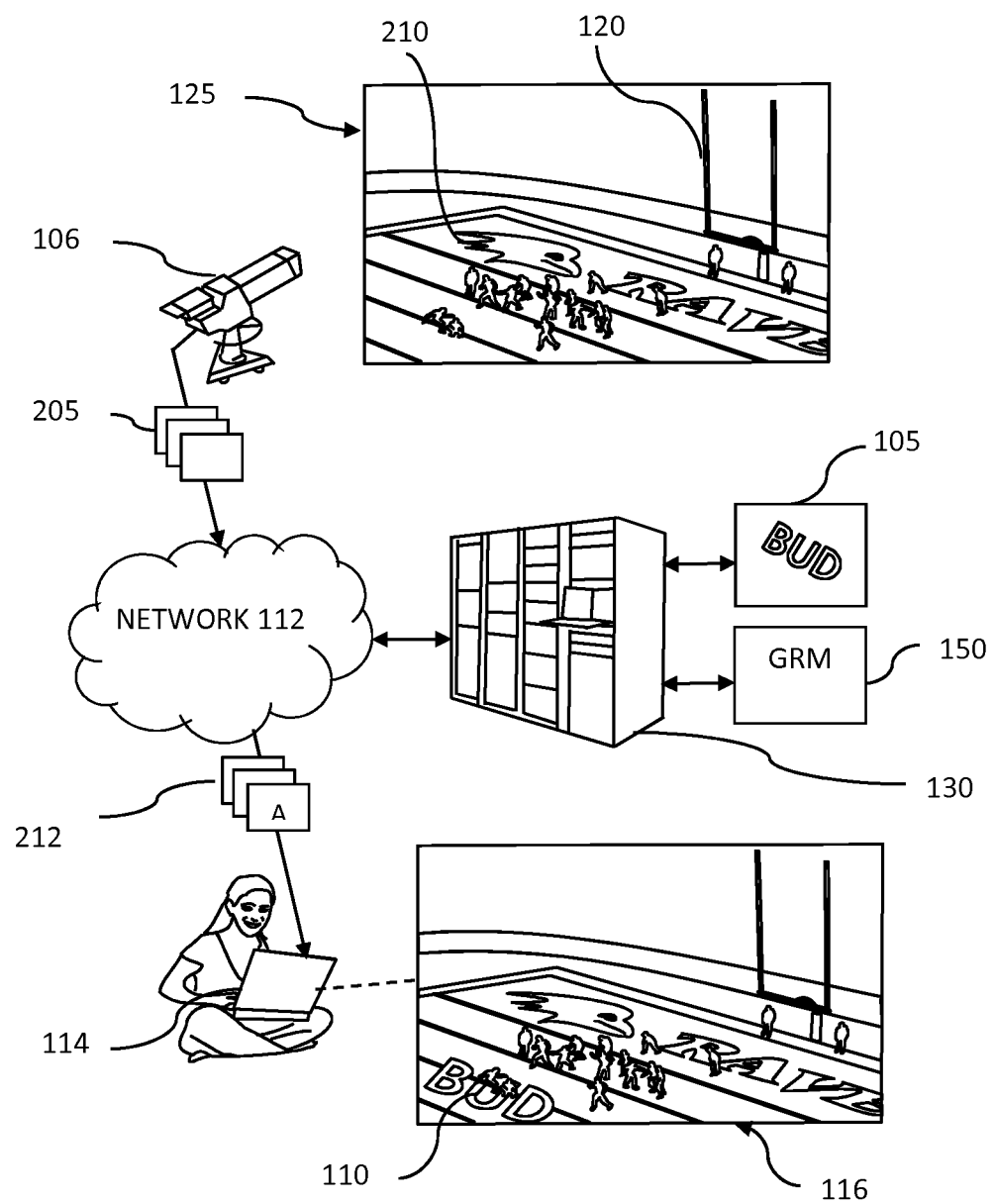
FIG. 1 shows schematic overview of a system using a graphic reference matrix to facilitate a virtual insertion of a digital graphic in accordance with one embodiment of the present invention.

The preferred embodiments of the present invention will now be described in more detail with reference to the drawings in which identical elements in the various figures are, as far as possible, identified with the same reference numerals. These embodiments are provided by way of explanation of the present invention, which is not, however, intended to be limited thereto. Those of ordinary skill in the art may appreciate upon reading the present specification and viewing the present drawings that various modifications and variations may be made thereto.

FIG. 1 shows schematic overview of a system using a graphic reference matrix to facilitate a virtual insertion of a digital graphic in accordance with one embodiment of the present invention.

An event that may be occurring at a first venue 125 may be filmed as part of a television broadcast production by a suitable camera such as, but not limited to, a broadcast digital video camera 106. The camera may send a stream of images 205 representative of the event being performed at the venue back to a digital data processor 130 via a digital communications network 112. The digital data processor 130 may, for instance, be part of a broadcast production studio and may be located either proximate to the venue or remote from the venue.

As part of the video production process, the digital data processor 130 may run software that analyzes one of more of the stream of images 205 in order to locate a digital representation of a reference landmark 120 located at the venue 125. This analysis may, for instance, be aided by the use of a graphic reference matrix 150.

The graphic reference matrix 150 may, for instance, be a database operational on a computer memory functionally connected to a digital data processor. The graphic reference matrix 150 may contain reference images that may be previously obtained digital images containing digital representations of the landmark. The references in the graphic reference matrix 150 may be indexed by parameters that are values indicative of information such as, but not limited to, the venue, the landmark, the pose of the landmark within the image, the pose of the landmark with respect to a further known landmark within the venue, the date and the time at which the image was captured, and a difference value between the reference image and some related or otherwise relevant image in the graphic reference matrix or some combination thereof.

By contrasting an acquired image from the stream of images 205 representative of the event performed at the venue with a preferred reference image retrieved from the graphic reference matrix 150, a representation of a landmark may be located by pattern recognition algorithms running on the digital data processor 130. By determining the pose of the recognized reference landmark 120 within the acquired image and with respect to the recognized landmark, a transformation may be calculated that may be a set of warp parameters required to conform the acquired image to the preferred reference image and/or vice versa. This required transform may then be used to perform the virtual insertion of a digital graphic 105 with a predetermined pose into the acquired image. This acquired image, now containing the virtually inserted digital graphic 105, may now be sent back on via the digital communications network 112 as a stream of enhanced digital images 212. This stream of enhanced digital images 212 may then be received at an end-user's digital display 114. The image 116 containing the virtual insertion may then be viewed on the end-user's screen having a virtual insertion 110 of the digital graphic 105. At the end-user's display the inserted graphic, which may also or instead be a video sequence or computer graphics, may appear in the stream of video images with the correct position, scale, orientation, and motion relative to the rest of the objects in the image.

As discussed in more detail below, the software operable on the digital data processor 130 may also perform functions to enhance and/or expand the graphic reference matrix 150. This enhancement may, for instance, include adding further reference images that contain representations of the same landmark, but taken at, for instance, different times, under different lighting conditions, when different events are held at the venue or when different cameras are used, or some combination thereof.

The enhancement of the graphic reference matrix 150 may also, or instead, include finding new landmarks within images, and creating new reference images for those landmarks. These new landmark reference images may be added to the graphic reference matrix 150 referenced by parameters indicative of information such as, but not limited to, the landmark, the venue, the time of capture of the image, the pose of the landmark within the image, the pose of the new landmark with respect to another known landmark, the lighting conditions, the event, the camera used to capture the image, or some combination thereof.

Figure 2:
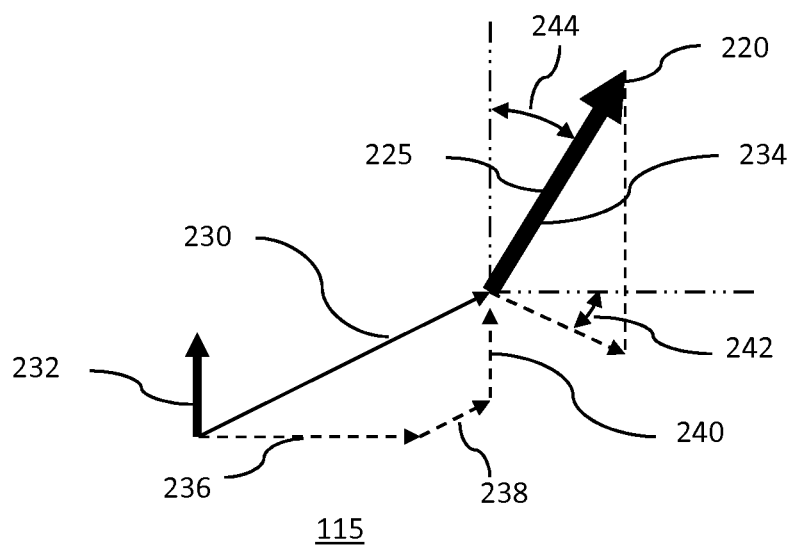
FIG. 2 shows a schematic representation of some of the elements constituting a pose.

FIG. 2 shows a schematic representation of some of the elements constituting a pose as referred to in this specification.

A required pose 115 of a magnified, displayed object 234 with respect to a unit reference object 232 may include parameters that define the location 230, the magnification 220 and the orientation 225 of the displayed object.

The location 230 may, for instance, be defined in Cartesian coordinates as the combination of a distance along an X axis 236, a distance along a Y axis 238 and a distance along a Z axis 240. In a given 2-dimension image, the location parameters may be reduced to simply the X and Y distances.

The orientation 225 may, for instance, be expressed as a combination of angles such as, for instance, a first and a second Euler angle 242 and 244. Alternate forms for expressing or representing orientation include a rotation matrix, a combination of an axis and a rotation, and a set of quaternions.

The magnification 220 may be expressed as a single number indicating the ratio of the magnified image with respect to a unit sized image.

Figure 3:
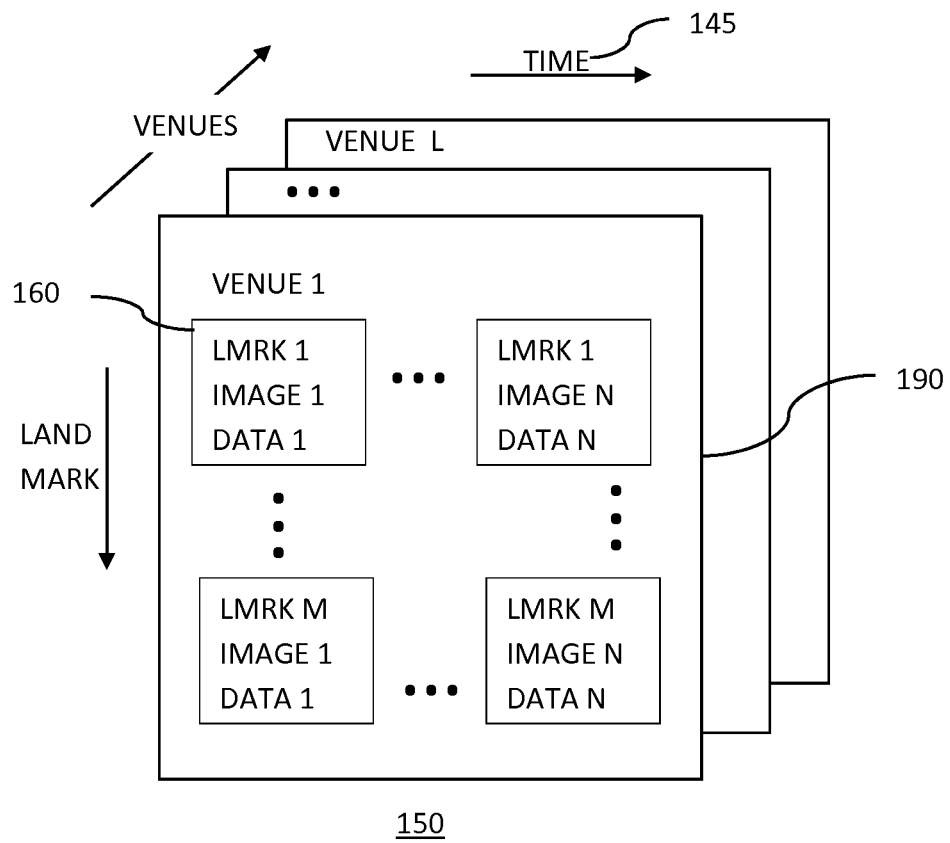
FIG. 3 shows a schematic representation of a graphic reference matrix in accordance with one embodiment of the present invention.

FIG. 3 shows a schematic representation of a graphic reference matrix in accordance with one embodiment of the present invention.

The graphic reference matrix 150 may be a database contained in a digital data memory module that may be functionally connected to the digital processor programmed to perform one or more image processing functions.

The graphic reference matrix 150 may, for instance, be designed to function as a set of venue data planes 190 such that each venue has a sub-matrix that may be arranged and indexed according to landmarks within the venue and the time, which may include the date, at which the image was captured. Each of the database elements 160 in a venue data plane 190 may contain a number of related components and parameters such as, but not limited to, a landmark, a digital image containing a representation of that landmark, data such as the time and date of capture, the camera used, the pose of the landmark within the image, the pose of the landmark with respect to other landmarks, a difference value between the digital image and other digital images containing the landmark, or some combination thereof.

The graphic reference matrix 150 may be set up so that the images within are indexed by, and may be referenced by, some or all of the parameters associated with the image, including, but not limited to, the venue, the landmark and the time and date of capture.

Figure 4:
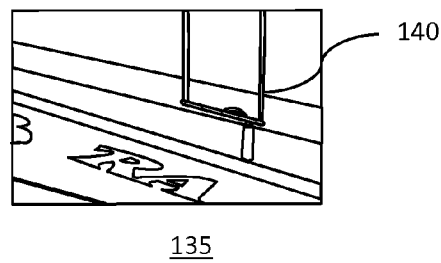
FIG. 4 A shows a graphic representation of a first digital image containing a representation of a reference landmark.
Figure 4:
Figure 4:
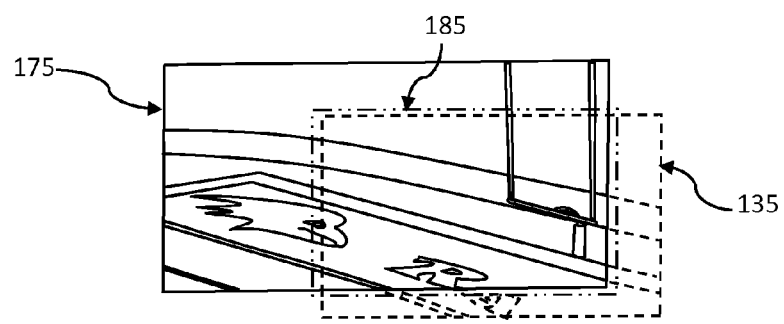
Figure 4:
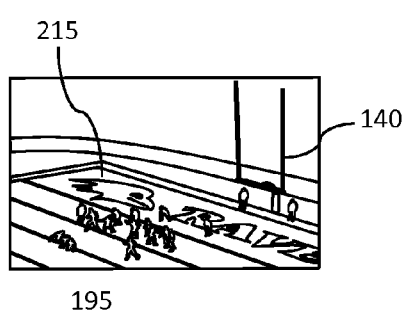
Figure 4:
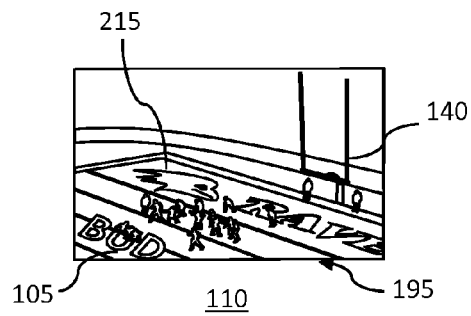

FIG. 4 A shows a graphic representation of an exemplary first digital image 135 containing a representation 140 of an exemplary reference landmark.

FIG. 4 B shows a graphic representation of an exemplary second digital image containing a representation 140 of the exemplary reference landmark.

FIG. 4 C shows a graphic representation of a suitably transformed 175 second digital image being compared with the first digital image 135.

The transformation of second digital image to the transformed second digital image 175 may, for instance, be performed by calculating the pose of the representation 140 of the reference landmark in each of the images. From this, the required transform to conform the representation of the landmark in the second image to its pose in the first image may be calculated as, for instance, a set of warp parameters such as, but not limited to, well-known affine warp parameters. Using these warp parameters, the entire second image may then be transformed to match the first image. This may create a region of overlap 185 between the two images. Within the region of overlap 185, corresponding pairs of pixels may be compared, and any differences in their values calculated. These individual differences between corresponding pixels may then be accumulated mathematically to provide a single difference value.

This difference value may be calculated by, for instance, summing the differences of one or all of the R, G, and B components of the pixel pairs. These sums may then be averaged by the number of pairs of pixels compared within the region of overlap 185. Alternately, the squares of the values may be summed, the square root of these sums taken, and the values averaged by the number of pixels compared within the region of overlap 185. The difference value may be stored as the averaged sum of the individual pixel components or may be combined to form a single difference value. In combining the summed component differences, the different components may be weighted differently so as to reflect, for instance, various types of ambient lighting used at the venue.

If the difference value exceeds a predetermined value, the transformed second digital image 175 may then be stored as an additional reference image, indexed by parameters that may include the difference value and the time of capture of the image.

Alternately, or in addition, the first digital image 135 may itself be stored as a further reference image, indexed by parameters that may include the pose of the landmark in the image and the pose of the landmark with respect to the landmark in the second digital image 165, as well as parameters such as the time of capture, and the difference value.

FIG. 4 D shows a graphic representation of a third digital image containing a representation 140 of a first reference landmark as well as a representation 215 of an object suitable for use as a new, second reference landmark.

FIG. 4 E shows a graphic representation of the third digital image 195 containing a representation 140 of a reference landmark and a virtual insertion 110 of a digital graphic 105. Such a virtual insertion 110 of a digital graphic may be done as described previously using a preferred reference image retrieved from the graphic reference matrix using standard image processing techniques. The preferred reference image may, for instance, be the one indexed by parameters such as, but not limited to, parameters indicative of it being a one taken most recently, a one having a difference value in a range that may be predetermined or that may be done by analysis of one or more pixels in the third digital image, a one taken on a previous date at a corresponding time of day, a one taken on a previous date when a corresponding event was occurring, one taken on a previous date under similar weather conditions, or some combination thereof.

The representation 215 of an object suitable for use as a new, second reference landmark may further be used to generate a new landmark for the venue for addition to the graphic reference matrix. This may, for instance, be accomplished by calculating the pose of the new landmark in the image and the pose of the landmark with respect to an existing landmark in the image. When added to the graphic reference matrix, the new landmark may be indexed by, and retrievable by parameters indicative of information such as, but not limited to, its pose, other landmarks it is referenced to, the time and date of capture or some combination thereof.

Figure 5:
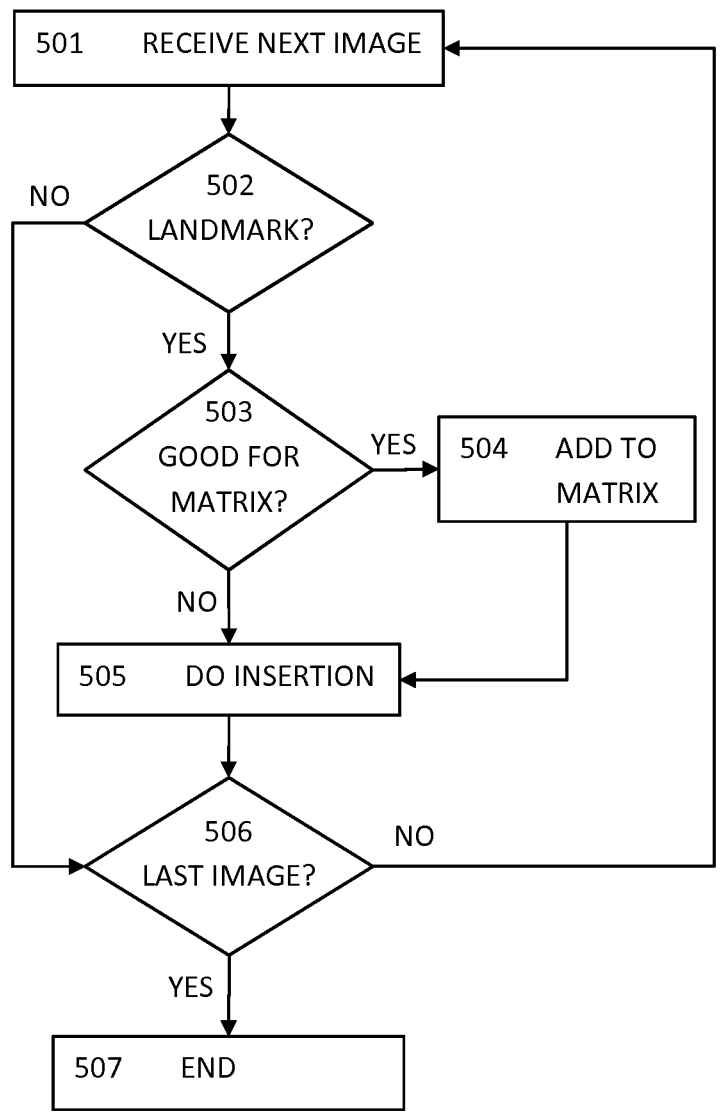
FIG. 5 shows a schematic flow diagram of a method of creating and/or expanding a graphic reference matrix in accordance with one embodiment of the present invention.

FIG. 5 shows a schematic flow diagram of a method of creating and/or expanding a graphic reference matrix in accordance with one embodiment of the present invention.

In Step 501 "Receive Next Image", a digital processor running suitable image processing software, may receive an image that may be the next image in a sequence of images representative of an event occurring in, or having occurred in, a venue where a performance or contest may be occurring.

In Step 502 "Landmark", the software algorithms may be used to detect one or more landmarks known to occur at the venue. If no landmark is detected, the software may go directly to Step 506 "Last Image" to determine if the current image is the last one in the sequence. If it is the last image, the software simply allows the image to proceed unaltered and then the software program ends. If it is not the last image in the sequence, the program may loop back to Step 501 to receive the next image and then on to check for a landmark.

If, in Step 502, a landmark is detected, the program may proceed to Step 503 "Good for Matrix?" in which it may determine whether or not to add this image to the graphic reference matrix.

If, for instance, the graphic reference matrix contains no reference image for this particular landmark at this particular venue, then the decision may be an easy one to include the image as a reference image. To do this the program may proceed to Step 504 and may add the image to the matrix. In adding the image to the matrix, it may be stored along with parameters, calculated or obtained by the software, that are indicative of relevant information such as, but not limited to, the date and the time of capture of the image, the landmark recognized, the pose of the landmark both within the image and with respect to any know reference points at the venue, or some combination thereof.

If the graphic reference matrix already contains a reference image indexed by the currently recognized landmark, the program may compare the current image to the reference image. This may, for instance, be accomplished by first transforming the current image to conform to the reference image by making the pose of the landmark in the current image match the pose of the landmark in the reference image. Such matching of poses may be accomplished by well-known image processing mathematical means such as, but not limited to, affine transformations. The region of overlap of the transformed current image and the reference image may then be compared by evaluating differences between the values of geometrically corresponding pairs of pixels. From these differences of pixel values a single difference value may be constructed. If this difference value exceeds a predetermined threshold, or lies within a predetermined range of values, the current image may be determined suitable for adding to the matrix. The program may then proceed to Step 504 and may add the transformed current image as a new reference image, and the difference value may be one of the parameters stored with the image and used to index it for future retrieval.

Step 505 "Do Insertion" may be reached directly via either Step 503 or Step 504. In this step, the program may use the pose of the detected landmark within the current image to place a digital graphic within the current image at a predetermined pose with respect to the landmark. The digital graphic that may be virtually inserted, or match-move combined with the current image may itself be a frame of a separate video sequence or of a computer generated animation sequence.

As described before, on reaching Step 506, the program may proceed to Step 507 "End" if there are no further images in the sequence, or if they are, it may loop back to Step 501 to receive the next image and continue the processing.

Figure 6:
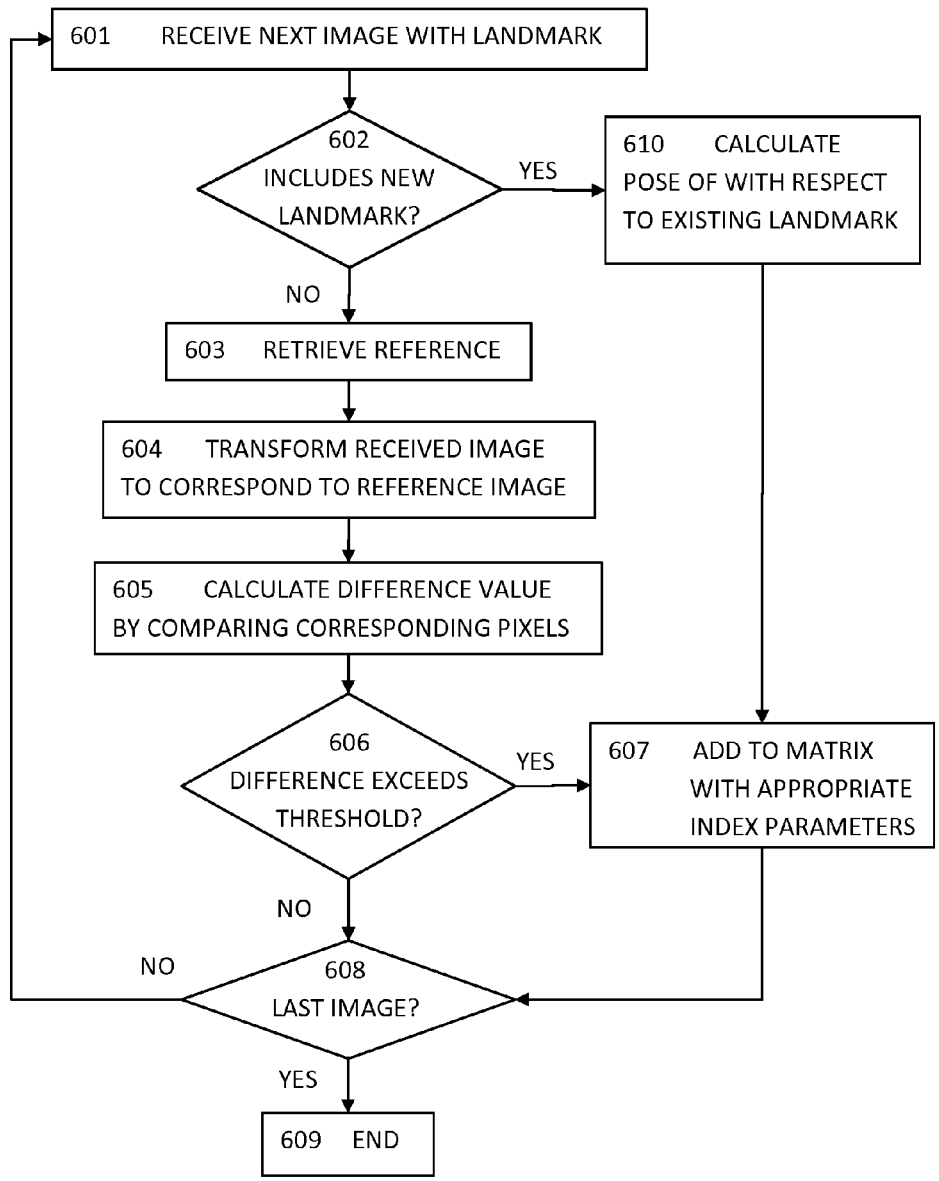
FIG. 6 shows a schematic flow diagram of a method of adding new material to a graphic reference matrix in accordance with one embodiment of the present invention.

FIG. 6 shows a schematic flow diagram of a method of adding new material to a graphic reference matrix in accordance with one embodiment of the present invention.

In Step 601 "Receive Next Image with Landmark" a suitably programmed digital processor may receive an image that another software module has already determined to contain a landmark.

In Step 602 "Includes a New Landmark?" an image processing software module operative on the digital processor may determine whether or not there is a representation of an object in the image, in addition to the already recognized landmark, that is suitable to be used as a new landmark. This determination may depend on factors such as, but not limited to, locating a region that has a particular range of colors, a particular range of geometric features or, a particular range of changes in contrast, color or geometry or some combination thereof. If such a region is located and is determined to be suitable as a landmark for future recognition or tracking, the software module may proceed to Step 610 "Calculate Pose of with Respect to Existing Landmark". In this step, the module may then calculate the pose of the newly identified landmark with respect to both the image itself and with respect to the existing landmark, before proceeding to Step 607 "Add to Matrix with Appropriate Index Parameters".

In Step 607, the software model may arrange for the current image to be added to the graphic reference matrix as being associated with the new landmark. The image may be indexed by the new landmark as well as parameters indicative of information such as, but not limited to, its pose with respect to the other landmark, its pose within the image, the date and time of capture of the image, the venue, the event, or some combination thereof.

Once the reference image and associated data are added to the graphic reference matrix, the software module may proceed to Step 608 "Last Image?" to ascertain if the last image in the stream of video images has been processed. If it has, the software module may proceed to Step 609 "End", and stop. If not, the software module may loop back to Step 601 to receive the next image with a landmark.

If in Step 602, no new landmark is detected, the software module may go through a series of steps to see if the current image may be a useful addition to the graphic reference matrix because it is illustrative of the landmark as seen in, for instance, different light conditions or as prepared for a different event.

In Step 603 "Retrieve Reference" an existing reference image for the recognized landmark may be retrieved from the graphic reference matrix.

In Step 604 "Transform Received Image to Correspond to Reference Image" the current, or received image, may be transformed to correspond geometrically to the reference image. This may for instance be accomplished by determining an affine transformation that may conform the pose of the landmark in the current image its pose in the reference image. Such an affine transformation may supply a set of warp parameters that may then be used to transform the entire current image so as to correspond geometrically to the reference image.

In Step 605 "Calculate Difference Value by Comparing Corresponding Pixels" the values of geometrically corresponding pixels within a region of overlap between the transformed current image and the reference image may be compared and used to calculate a difference value, as detailed above.

In Step 606 "Difference Exceeds Threshold?" the software module may determine if the difference value obtained in Step 605 exceeds some predetermined threshold or lies within some predetermined range of values. If the difference value does one of these then the software module may proceed to Step 607 and add the transformed current image to the graphic reference matrix.

In Step 608 "Last Image?" the software module may determine if there are further images to process. If not, it may proceed to Step 609 and end. If there are, it may return to Step 601 to receive the next image with a landmark.

Although this invention has been described with a certain degree of particularity, it is to be understood that the present disclosure has been made only by way of illustration and that numerous changes in the details of construction and arrangement of parts may be resorted to without departing from the spirit and the scope of the invention.

The invention claimed is:

1. A method of using a graphic reference matrix for a virtual insertion of a digital graphic, comprising:
   providing said digital graphic;
   providing a required pose for said virtual insertion of said digital graphic, said required pose being articulated with respect to a first reference landmark associated with a first venue;
   providing a digital data processor programmed to perform the functions of:
      receiving a first digital image containing a representation of said first reference landmark and a first time of capture;
      storing said first digital image in said graphic reference matrix as a first reference image, said graphic reference matrix comprising a database operational on a computer memory functionally connected to said digital data processor;
      indexing said first reference image by parameters comprising values indicative of said first venue, said first reference landmark and said first time of capture;
      receiving a second digital image containing a representation of said first reference landmark and having a second time of capture;
      retrieving said first reference image from said graphic reference matrix;
      transforming said second digital image into a transformed second digital image such that a magnification, an orientation and a location of said representation of said first reference landmark within said transformed second digital image corresponds to the size, orientation and location of said representation of said first reference landmark within said first reference image;

comparing said transformed second digital image to said first reference image to determine a difference value, said comparing comprising evaluating a difference between a value of a pixel of said transformed second digital image and a value of a corresponding pixel of said first reference image, and wherein said difference value comprises a mathematical accumulation of a plurality of said differences of evaluated pairs of pixels;

storing, if said difference value exceeds a predetermined value, said transformed second digital image in said graphic reference matrix as a second reference image indexed by said first venue, said first reference landmark, said second time of capture and said difference value;

receiving a third digital image from a stream of images representative of an event performed at said first venue;

locating within said third digital image a representation of said first landmark;

retrieving a preferred reference image from said graphic reference matrix;

contrasting said third digital image with said preferred reference image to determine a required transformation, said required transformation comprising a set of warp parameters for conforming said third digital image to said preferred reference image; and using said required transformation to perform said virtual insertion of said digital graphic into said third digital image.

2. The method of claim 1 wherein said digital processor further performs the functions of:

recognizing within said third digital image, a representation of an object suitable for use as a new, second reference landmark;

calculating a pose of said new, second reference landmark with respect to said first reference landmark;

storing said third digital image and said calculated pose in a graphic reference matrix as a third reference image; and indexing said third reference image by parameters comprising values indicative of said first venue, said second reference landmark and time of capture of said third digital image.

3. The method of claim 1 wherein said preferred reference image is the reference image indexed by a time of capture temporally closest to a time of capture of said third digital image.

4. The method of claim 1 wherein said preferred reference image is the reference image having a difference value closest to a predetermined required difference value.

5. The method of claim 1 wherein said evaluating a difference between values of corresponding pixels uses only one of a red, a green or a blue component of the value of the pixel.

6. The method of claim 1 wherein said evaluating a difference between values of corresponding pixels uses only two of a red, a green or a blue component of the value of the pixel.

7. The method of claim 1 wherein said mathematical accumulation comprises a square root of the sum of the differences in pixel values.

8. The method of claim 1 wherein said mathematical accumulation comprises a square root of the sum of the weighted differences in pixel values.

9. The method of claim 1 wherein weighting comprises using an xxx function.

10. The method of claim 1 wherein said set of warp parameters comprises an affine transformation.

11. The method of claim 1 wherein said set of warp parameters comprises an xxx transformation.

12. The method of claim 1 wherein said digital graphic comprises an animated video sequence.

\* \* \* \* \*